United States Patent [19]

Knapp et al.

[11] 4,124,745
[45] Nov. 7, 1978

[54] ACCUMULATOR WITH PLATE ELEMENT HAVING A RIB FOR SECURING TO CELL WALL

[75] Inventors: Karl Knapp, Luthe; Siegfried Prause, Berenbostel, both of Germany

[73] Assignee: Varta Batterie AG, Hanover, Germany

[21] Appl. No.: 668,502

[22] Filed: Mar. 19, 1976

[30] Foreign Application Priority Data

Apr. 16, 1975 [DE] Fed. Rep. of Germany ....... 2516729

[51] Int. Cl.² .......................................... H01M 10/16
[52] U.S. Cl. .................................................. 429/208
[58] Field of Search .......................... 136/81, 79, 80; 429/208, 209

[56] References Cited

U.S. PATENT DOCUMENTS

| 2,539,946 | 1/1951 | Debeh | 136/81 |
| 2,727,079 | 12/1955 | Chubb et al. | 136/81 X |
| 2,820,080 | 1/1958 | Kaljot | 136/81 |
| 3,369,936 | 2/1968 | Noll | 136/81 X |
| 3,443,995 | 5/1969 | Halsall et al. | 136/79 |
| 3,909,294 | 9/1975 | Kosuge et al. | 136/81 |

Primary Examiner—C. F. LeFevour
Attorney, Agent, or Firm—Herbert L. Lerner

[57] ABSTRACT

An accumulator with plate element of positive and negative electrode plates with interposed separators, lugs on the electrode plates interconnected by connecting straps, and at least one rib secured on the top surface of the plate and separator to secure the plate element to end walls. This enhances the capability of the accumulator to withstand vibration, i.e. makes it shake-resistant.

12 Claims, 4 Drawing Figures

ACCUMULATOR WITH PLATE ELEMENT HAVING A RIB FOR SECURING TO CELL WALL

This relates to an accumulator and more particularly refers to a new and improved accumulator with a plate element of positive and negative electrode plates with interposed separators, the lugs of which electrode plates are interconnected by connecting straps.

In electric accumulators, particularly, in lead accumulators, the plate element consists of positive and negative electrode plates which are layered upon each other with separators disposed in between. Electrode plates of the same polarity are connected by a connecting strap or pole bridge at their plate lugs. This connecting strap is, in most cases, produced by pouring liquid lead around the plate lugs in a mold. It can also be fused to the plate lugs. The connecting straps of adjacent cells of multiple cell accumulators, are connected with each other by cell connectors. In modern accumulator configurations, these cell connectors are carried through the cell separating walls of the multiple cell case or container. The multi-cell case of these accumulators is made of hard rubber or particularly of thin walled polypropylene, and may be made of other suitable plastics.

Because of their use in motor vehicles, for example, such accumulators must be rather shake-resistant and a great number of rejects in shake tests, vibration tests, are caused by damage in the region of the joint of the connecting strap with the plate lugs. During vibration or shaking of the batteries, some single plates move upward or whole elements move up and thus cause breakage of the connecting strap.

An object of the present invention is to provide an accumulator with greater capability to withstand shaking, which accumulator can be efficiently mass produced.

In accordance with the present invention, resistance to vibration or shaking of batteries is achieved by an accumulator with a plate element composed of positive and negative electrode plates with interposed separators, lugs on the electrode plates electrically and mechanically connected by pole connecting straps, and at least one rib secured on the top surface of the plate element to secure said plate element.

In another embodiment of the invention, the case enclosing the plate element is made of plastic, and the rib is made of an injected plastic compatible with the plastic of the case. The rib is fused and therefore bonded to an end wall of the case and to cell separating walls in the case.

In a further embodiment, the rib is cemented onto the plate element by means of an adhesive, preferably a thixotropic synthetic resin, such as a polyurethane resin.

In a still further embodiment, the end walls of the case have additional ribs with recesses and the ends of the ribs are secured in such recesses.

Other features which are considered as characteristic for the invention are set forth in the appended claims.

Although the invention is illustrated and described herein as embodied in the accumulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
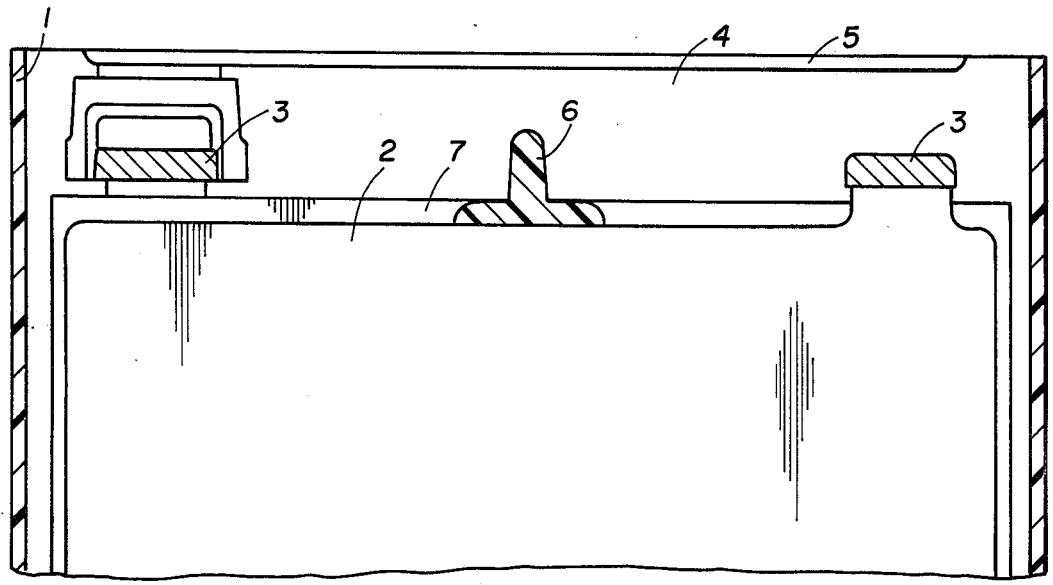
FIG. 1 is a simplified cutaway view in partial section to illustrate the relationship of the electrode plates, connecting straps, cell separation walls, rib and case.

Referring to FIG. 1, the plate element consisting of electrode plates 2 and separators 7 is disposed in the case, i.e. element container 1, with several positive and negative electrode plates and interposed separators. The plate lugs of the respective positive and negative electrode plates are respectively connected by a positive and a negative connecting strap 3 which connecting straps are connected with the connecting straps of adjacent cells by cell connectors through cell separation wall 4. Plastic is injected around the cell connectors passing through separating wall 4 in known manner as for example, as described in German Pat. No. DT-PS 1 804 800. In some cases, a reinforcement 5 is jet-molded into the separating wall, as described in German Pat. No. DT-PS 1 928 288 to facilitate the later seating of the cover by the known Spiegel-Schweiss method. In accordance with the invention, at least one rib 6 is jet molded on the plate element which rib is formed of suitable plastic and runs preferably approximately parallel to connecting straps 3. As illustrative, the rib can be centrally disposed between connecting straps 3 or several ribs can be arranged between the connecting straps.

The plastic which forms the ribs is injected in the hot state whereby the rib fuses with the walls of case 1 as well as cell separators 4 of element container 1 and braces each electrode plate 2 and each separator against the top. By these means, it has become possible to reliably secure larger plate elements which contain a larger number of electrode plates in an accumulator against vibration and shaking.

The injected ribs form a solid fixed connection in the upper region of the case and give the battery strong support, particularly in that part where a handle would be secured.

By the application of ribs, the cell separating walls and the outer walls of the case are accurately fixed so that it is not necessary to provide thicker sections of the cell separating walls and safety ribs on the covers. The closing with a cover of the batteries is greatly improved, since the outer walls and the cell separating walls of the case match accurately with the cover.

Rib 6 preferably consists of the same plastic material as the case, desirably polypropylene. In conventional starter batteries with a plate width of approximately 2 mm, its width should be 2 mm up to 6 mm, according to the length of the cell. The height of the rib should be 8 to 15 mm.

This jet molded rib may be manufactured in practice by injection of a plastic material, particularly polypropylene, in a mold which is attached to the assembled plate element, for example, a U-shaped jet mold which is open on the bottom. During the injection of the liquid plastic, a small portion of this material penetrates into the interspaces between the electrodes and the separators so that a very strong joint is formed and, in addition, the material fuses with the walls of the case and the cell separating walls. The accumulator thus produced has outstanding resistance under vibrational loads.

Figure 2:
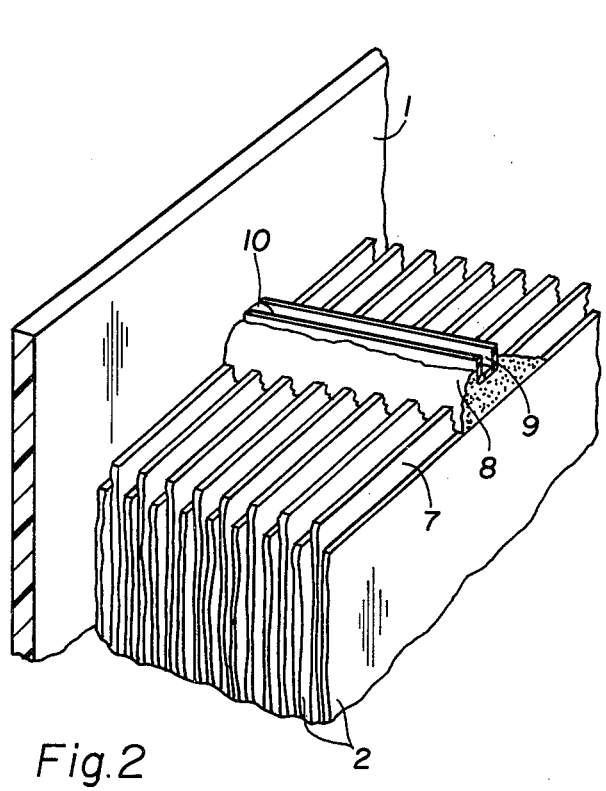
FIG. 2 is an isometric view of another embodiment illustrating the relationship of the rib with the other elements of the accumulator.

The further embodiment illustrated in FIG. 2 is suitable for use for element containers made of plastic and also for containers made of hard rubber. An adhesive bead 8 is applied to the plate block consisting of electrode plates 2 and separators 7. Thixotrope synthetic resins, respectively thixotrope multi-component adhesives are especially useful. Rib 9 is placed onto this material and, for example, rib 9 can be of U-shaped and open towards the top, so that more synthetic resin can be poured in to make a reliably solid connection with end walls 10 and cell separating walls 4.

Figure 3A:
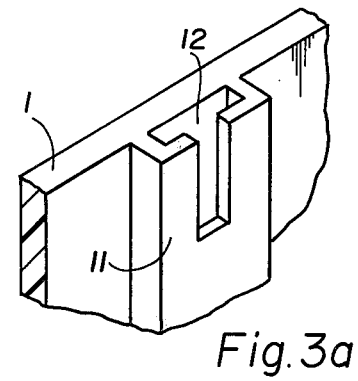
FIG. 3a is an isometric view of an end wall of the case with an added rib with a recess.
Figure 3B:
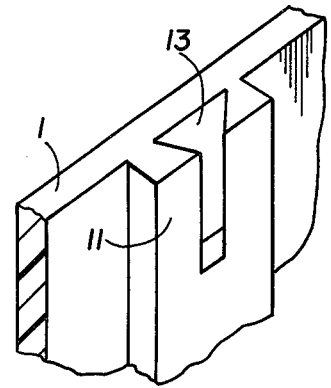
FIG. 3b shows the recess of the added rib with a dovetail-shaped undercut.

If an injected rib of plastic is to be used with a hard rubber container, it is useful to make provisions to secure the rib to the endwalls of the rubber container. For this purpose, as shown in FIGS. 3a and 3b, a further rib 11 can be formed along the endwalls 10 and cell separating walls 4 of the hard rubber case 1 which rib has a recess 12 in its upper region. When plastic is injected into the plate element, as explained above, the plastic also enters into recess 12, where, after solidification, forms a strong joint between rib 6 and cell separating walls 4, endwalls 10 by anchoring of the end of rib 6 in recess 12. Recess 13 is a particular embodiment of the recess with dovetail-shaped undercuts, shown in FIG. 3b, assures a particularly good hold.

The method of securing plate elements in accordance with the invention, has special importance in the manufacture of larger batteries for use in contruction vehicles and batteries subjected to high vibration loads. Loads on the connectors, generated by shaking of the batteries, are absorbed by the fixed position of the plate elements. A breakage of the connector will rarely, if ever, occur.

The method to inject plate element holders is readily incorporated in the manufacturing process and does not affect the cycle times of assembly lines as for example described in German Pat. No. DT-PS 2 022 163.

There are claimed:
1. An accumulator having at least one single cell;
said cell comprising a cell case in which is arranged a plate block constructed of positive electrode plates, negative electrode plates and separators;
lugs on the plates of each polarity connected by pole connecting straps;
a rib bonded in fixed connection with the electrode plates and the separators at the top surface of the plate block; and
said rib also bonded to the end walls of the cell case.

2. Accumulator according to claim 1, wherein the rib is connected to the plate block by injection of a plastic.

3. Accumulator according to claim 1, wherein the rib is cemented onto the plate block by means of an adhesive.

4. Accumulator according to claim 3, wherein said adhesive is a thixotropic resin.

5. Accumulator according to claim 1, wherein said endwall of said case has an additional rib with recess and wherein the end of said rib is secured in said recess of said additional rib in said endwall.

6. Multicell accumulator having a cell case subdivided into a plurality of single cell compartments by internal cell separating walls with a cell adjacent an endwall of the cell case bounded by an endwall and a cell separating wall and a cell interior in the cell case bounded by two cell separating walls;
a plate block disposed in each single cell compartment, constructed of positive electrode plates, negative electrode plates and separators;
lugs on the plates of each polarity connected by pole connecting straps;
a rib in at least one single cell compartment bonded in fixed connection with the electrode plates and the separators at the top surface of the plate block in the single cell compartment; and
said rib also bonded to said walls bounding said single cell.

7. Multicell accumulator according to claim 6, wherein a cell adjacent an endwall of the cell case has said rib connected to the adjacent endwall of the cell case and to the cell separating wall bounding the cell.

8. Accumulator according to claim 7, wherein said endwall of said case has an additional rib with recess and wherein the end of said rib is secured in said recess of said additional rib in said endwall.

9. Multicell accumulator according to claim 6, wherein a cell interior in the cell case has said rib connected to the two cell separating walls bounding the cell.

10. Accumulator according to claim 6, wherein the rib is connected to the plate block by injection of a plastic.

11. Accumulator according to claim 6, wherein the rib is cemented onto the plate block by means of an adhesive.

12. Accumulator according to claim 11, wherein said adhesive is a thixotropic resin.

* * * * *